Aug. 8, 1939.  E. DAUSCH  2,168,667
CONTROL DEVICE FOR CHANGE-SPEED GEARS
Filed March 12, 1938  2 Sheets-Sheet 1

Inventor
Erwin Dausch
By Watson, Cole, Morse & Grindle
Attorney

Aug. 8, 1939.  E. DAUSCH  2,168,667

CONTROL DEVICE FOR CHANGE-SPEED GEARS

Filed March 12, 1938  2 Sheets-Sheet 2

Inventor:
Erwin Dausch
By Watson, Cole, Grindle
Attorneys.

Patented Aug. 8, 1939

2,168,667

UNITED STATES PATENT OFFICE 2,168,667

CONTROL DEVICE FOR CHANGE-SPEED GEARS

Erwin Dausch, Friedrichshafen-on-the-Bodensee, Germany, assignor to Maybach-Motorenbau Gesellschaft mit beschrankter Haftung, Friedrichshafen-on-the-Bodensee, Germany, a corporation of Germany Application March 12, 1938, Serial No. 195,622
In Germany June 30, 1937

4 Claims. (Cl. 74—364)

The present invention relates to control devices for the pressure medium of gear-changing devices of gear-wheel change-speed gears, more particularly in motor vehicles, of the kind in which the engagement of one or more of the speed ratios has to be effected in stages, a first stage taking place, for example, with acceleration of a clutch member or other positive-engaging gear ratio change member to be engaged and another with retardation of a clutch member or other positive-engaging gear ratio change member. In such control devices it has already been proposed to provide shut-off members, dependent upon the transmission stages, by means of which the admission of pressure medium to the gear ratio changing cylinders is controlled in such a manner that during the operation of the gear ratio changing cylinder effecting one stage, the admission of pressure medium is prevented to the gear ratio changing cylinders of those transmission stages which require a different kind of gear ratio change.

The object of the present invention is to provide an improved construction of such control devices from the point of view of simplification, reduction of leakage and improved reliability of operation.

According to the invention, the shut-off members dependent upon the transmission stages control a main shut-off member which is common to them and controls the admission to the control conduits of cylinders requiring a different kind of gear ratio change.

Figure 1:
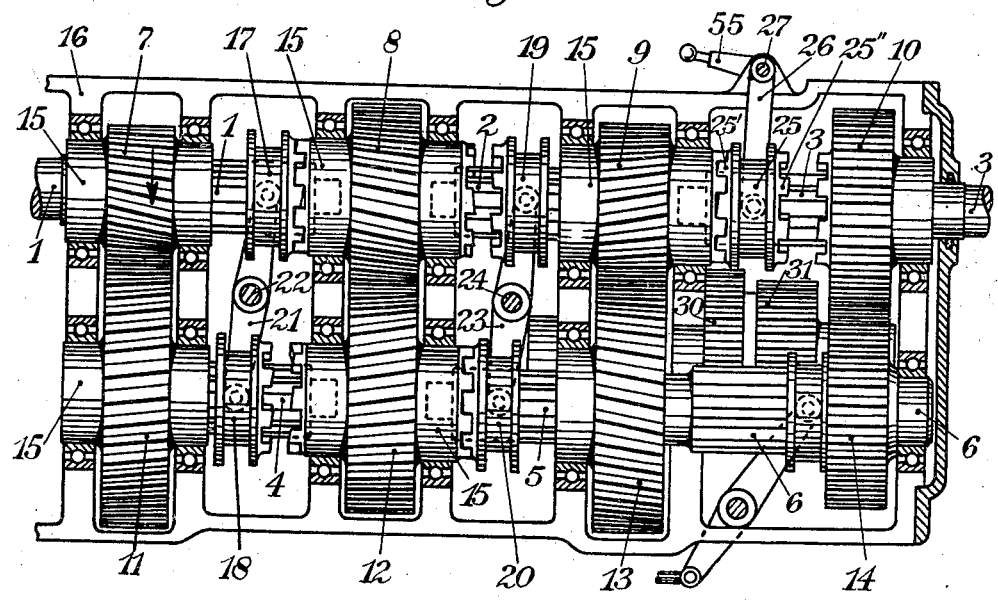

In the accompanying drawings, Figure 1 shows a gear mechanism provided with a control device according to the invention. A constructional form of such a control device, which is arranged in front of the parts shown in Figure 1 and which in the present case is operated for example by means of vacuum is shown by way of example in Figure 2, principally in section.

The change-speed gear comprises a sectional main shaft carrying the gear wheels 7, 8, 9, 10 and a sectional layshaft carrying the gear wheels 11, 12, 13 and 14. The gear wheels 7, 9, 11 and 13 are fast on their corresponding shaft sections 1, 2, 4 and 5 or 6, while gear wheel 10 is freely rotatable on shaft section 3 and gear wheel 14 is splined on shaft section 6. Gear wheels 7, 8, 9, 11 and 12 are mounted with their hubs 15 in the housing 16, gear wheels 8 and 12 having bores in which the adjacent shaft sections 1 and 2 or 4 and 5 are mounted. Betwen the permanently meshed pairs of wheels 7/11, 8/12 and 9/13 are change-speed dog clutches 17, 18 and 19, 20, which in the present case, particularly for the purpose of shortening the overall length, are constructed in such a manner that the clutches 17 and 19 are in the main shaft train and the corresponding clutches 18 and 20, respectively, are in the layshaft train. The clutch-shifting lever 21 connecting the clutches 17 and 18 together is secured to a shaft 22 and the clutch-shifting lever 23 for actuating the clutches 19 and 20 is secured to a shaft 24. In addition, on the shaft section 3, is splined a double dog clutch 25, its teeth 25' being adapted to be brought into engagement with corresponding dog teeth of the gear wheel 9, and its teeth 25" being adapted to be brought into engagement with corresponding dog teeth on the gear wheel 10. The clutch-shifting lever 26 for this change-speed dog clutch 25 is fast on a shaft 27. The clutch teeth of all the clutches (17, 18; 19, 20; 25) are provided with bevelled end faces, whereby engagement of the clutches is effected in known manner at the moment of overtaking.

Mounted on a further short layshaft is a reversing drive 30, 31, the gear wheel 30 whereof can be brought into engagement with the gear wheel 14, when the latter has been shifted to the left, and its gear wheel 31 can be brought into engagement with the gear wheel 10.

The bevelling of the end faces of the dogs indicated in Figure 1 corresponds to the direction of rotation shown at wheel 7 in Figure 1. Starting for example from the engagement of the clutch 17 with the clutch member provided in gear wheel 8, as indicated in Figure 1, and if instead thereof the clutch 18 is to be brought into engagement with the corresponding clutch member mounted on gear wheel 12, then when the dogs of clutch 18 are applied to the dogs connected to gear wheel 12, the latter dogs will first be running more quickly and will therefore reject the dogs of clutch 18 (position of rejection). If now, by opening the throttle, the driver increases the speed of gear wheel 7 and hence also of gear wheel 11 and of the clutch 18 connected to shaft 4 of said gear wheel 11, the clutch 18 will finally overtake the counter-clutch member connected to gear wheel 12 and the engagement of the clutch will be effected in known manner.

Engagement takes place in a similar manner when clutch 18 is brought out of engagement and clutch 17 is engaged. In this case, the clutch member connected to gear wheel 8 is the more slowly running member. The dogs of the, at first, more rapidly running clutch 17, which move past the said clutch member connected to gear wheel 8 will be rejected until, due to the diminishing speed of the engine, their speed will also fall below that of the clutch member connected to gear wheel 8, engagement then taking place.

If the gear mechanism shown in Figure 1 permitting eight forward and four reverse speeds is employed as a seven speed gear, the following sequence of speeds may be obtained for example, 29 teeth being provided for example on the gear wheel 7, 40 teeth on gear wheel 8, 35 on gear wheel 9, 44 on gear wheel 10, 60 on gear 11, 48 on gear wheel 12, 53 on gear wheel 13 and 22 teeth on gear wheel 14;

Forward:

I. Shaft 1, gear wheel 7, gear wheel 11, shaft 4, clutch 18, gear wheel 12, gear wheel 8, clutch 19, shaft 2, gear wheel 9, gear wheel 13, shaft 6, gear wheel 14, gear wheel 10, clutch 25″, shaft 3.

II. Shaft 1, gear wheel 7, gear wheel 11, shaft 4, clutch 18, gear wheel 12, clutch 20, shaft 5, gear wheel 13, shaft 6, gear wheel 14, gear wheel 10, clutch 25″, shaft 3.

III. Shaft 1, clutch 17, gear wheel 8, clutch 19, shaft 2, gear wheel 9, gear wheel 13, shaft 6, gear wheel 14, gear wheel 10, clutch 25″.

IV. Shaft 1, gear wheel 7, gear wheel 11, shaft 4, clutch 18, gear wheel 12, gear wheel 8, clutch 19, shaft 2, gear wheel 9, clutch 25′, shaft 3.

V. Shaft 1, gear wheel 7, gear wheel 11, shaft 4, clutch 18, gear wheel 12, clutch 20, shaft 5, gear wheel 13, gear wheel 9, clutch 25′, shaft 3.

VI. Shaft 1, clutch 17, gear wheel 8, clutch 19, shaft 2, gear wheel 9, clutch 25′, shaft 3 (direct drive).

VII. Shaft 1, clutch 17, gear wheel 8, gear wheel 12, clutch 20, shaft 5, gear wheel 13, gear wheel 9, clutch 25′, shaft 3 (speed shown in drawings).

A reverse drive is for example:

Shaft 1, gear wheel 7, gear wheel 11, shaft 4, clutch 18, gear wheel 12, gear wheel 8, clutch 19, shaft 2, gear wheel 9, gear wheel 13, shaft 6, gear wheel 14, gear wheel 30, gear wheel 31, gear wheel 10, clutch 25″, shaft 3.

If the gear box shown is used as a six-speed gear, the sequence of speeds shown hereunder may be obtained for example (of course, the transmission ratios of the various gear wheels is altered correspondingly):

*Forward*

| Ia | as | I. |
| IIa | as | II. |
| IIIa | as | IV. |
| IVa | as | V. |
| Va | as | VI. |
| VIa | as | VII. |

*Reverse*

Ra as R.

Figure 2:
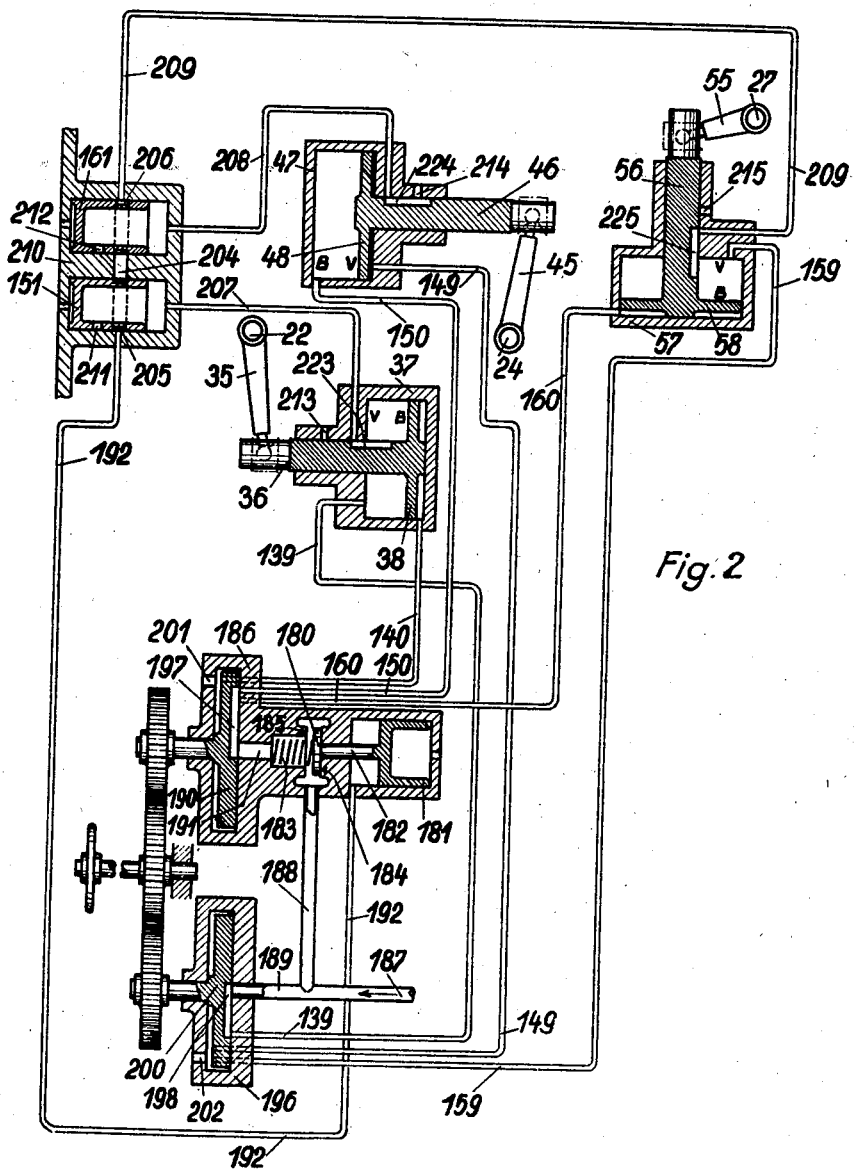

As will be seen in Figure 2, mounted on the shaft 22 connected to the clutch-shifting lever 21 for the change-speed dog clutch 17, 18 is an actuating arm 35 which is adapted to be rocked by the piston rod 36 of a piston 38 slidable in a cylinder 37. Opening into said cylinder 37, on the right and left of piston 38 respectively, are conduits 140 and 139, of which the former leads to a distributing valve 190 and the latter to a distributing valve 200.

In the same way, secured to the shaft 24 connected to the clutch-shifting lever 23 for the change-speed dog clutch 19, 20 is an actuating arm 45 adapted to be rocked by the piston rod 46 of a piston 48 slidable in a cylinder 47. Opening into this cylinder 47 on opposite sides of the piston 48 are respectively conduits 149 and 150, which lead to the distributing valves 200 and 190 respectively.

Mounted on the shaft 27 connected to the clutch-shifting lever 26 for the change-speed dog clutch 25 is an actuating arm 55 which is adapted to be rocked by means of the piston rod 56 of a piston 58 slidable in a cylinder 57. Opening into this cylinder on the right and left of the piston 58, respectively, are conduits 159 and 160, the conduit 159 leading to the distributing valve 200 and the conduit 160 to the distributing valve 190.

The end positions of the pistons 38, 48, 58 are denoted by B or V, according to whether the transfer of these pistons into the denoted position is accompanied by an acceleration or retardation gear change.

To the rear of the distributing valve 190 is a shut-off valve 180 which is moved by the piston 181 acting through the pin 182 and is held by a spring 183 in the opened position against the surface 184. 185 is the seat of the valve in the housing 186. 187 is a conduit for pressure medium which in the present case is connected to the induction pipe of the engine. This conduit forks into the two branches 188 and 189 leading to the two housings 186 and 196 of the distributing valves 190 and 200. 191 is a passage in the housing 186, and 192 is a communicating conduit. 197 and 198 are control grooves in the distributing valves 190 and 200. 201 and 202 are bores in the housings 186 and 196, through which the inner chambers of these housings are connected to the outer air.

151 and 161 are two shut-off slide valves arranged in the housing 210 and connected to the cylinders 37 and 47 by the conduits 207 and 208. 209 is a connecting conduit between the cylinder 57 and the housing 210. The pistons 151 and 161 have short passages 211 and 212 and also annular grooves 205 and 206. 204 is a connecting passage between the two guide bores for the pistons 151 and 161 in the housing 210.

The piston rods 36, 46, and 56 are provided with grooves 223, 224 and 225. In the extensions of the cylinders 37, 47 and 57 guiding the piston rods are bores 213, 214 and 215 which are in communication with the outer air.

The operation of the control device shown in the drawings will now be described for changing from the second to the third speed.

In Figure 2, the pistons of the gear ratio changing cylinders are shown in the positions corresponding to the second speed. The distributing valves 190 and 200 appropriately coupled together have just been set to the position corresponding to the third speed, so that the conduit 150 of the cylinder 47 is connected by the control groove 197 of the distributing valve 190 to the passage 191 which is connected through the conduits 188, 187 to the induction pipe of the engine. At the same time, the control groove 198 of the distributing valve 200 connects the conduit 139 of the cylinder 37 to the conduit 189 which is connected to the conduit 187 and hence also to the induction pipe of the engine. The extraction of air through the conduit 139 causes a reduced pressure on the left-hand side of the piston 38 so that the latter moves out of its right-hand end position still shown in Figure 2 at first so far to the left until the clutch 17 is in the position of rejection at the counter-clutch on the wheel 8. Engagement does not yet take place since the clutch 17 is rotating more rapidly than the counter-clutch.

In this position air from the right-hand side of the valve 151 is drawn through the conduit 207 and the groove 223 into the cylinder 37 with the result that the small valve 151 moves to the right. The bore 211 is thereby brought in front of the connection of the conduit 192, while simultaneously the passage 204 opposite is shut off. Air is now drawn into the conduit 207 from the conduit 192 with consequent reduction of the pressure on the left of the small piston 181. The piston 181 is thereby moved to the left by atmospheric pressure and the valve 180 is applied to the seat 185 against the pressure of the spring 183. The passage 191 is thereby shut off from the induction pipe of the engine. Although the conduit 150 is connected to the passage 191 by the distributing valve 190, no air can be drawn out of it. The piston 48 therefore at first 1 - mains in its right-hand end position and the clutch 20 remains engaged.

If now, due to the reduction in speed of the engine, the speed of clutch 17 commences to fall below that of wheel 8, the clutch 17 is able to engage and hence also atmospheric pressure is able to move the piston 38 completely into its left-hand end position, the right-hand edge of the groove 223 first interrupting the connection between the conduit 207 and the space on the left in front of the piston 38. When the piston 38 has moved completely into its left-hand end position, the conduit 207 is connected by the groove 223 to the bore 213, through which the space on the right of the piston valve 151 is now connected to the outer air via the conduit 207 and the groove 223. The piston valve 151 is therefore free to return into its left-hand end position which may be effected by a return spring (not shown) or by gravity if the valves are suitably disposed. The conduit 192 is thereby connected via the annular groove 205, connecting passage 204 and the annular groove 206 as well as the conduit 209 and the groove 225 in the rod 56 of the piston 58 with the space above the piston 58, and via the conduit 159, corresponding bore in the valve 200, space above this valve and the bore 202 in the valve housing with the outer air. Due to the outer air supplied in this way via conduit 192 to the space on the left in front of the piston 181 equalising the fluid pressures on opposite sides of the piston 181 the latter is again returned into its right-hand end position and the valve 180 is lifted off its seat by the pressure of its spring 183 and is applied against the surface 184.

Air can now be drawn through the conduit 188, the passage 191 and control groove 197 in the distributing valve 190 from the conduit 150. The piston 48 is therefore moved to the left by atmospheric pressure, the clutch 20 is brought out of engagement and the clutch member 19 is applied to the counter-clutch member on the wheel 8, where it is at first rejected on account of its higher speed. It comes into engagement as soon as the speed of wheel 8 has been increased to the overtaking speed by opening the throttle, the piston 48 moving into its left-hand end position. The gear changing operation is thus terminated.

In this gear ratio change, the groove 224 on the piston rod 46 does not exert any effect on the valve 161, since the space to the right of the piston 48 and hence also the conduit 208 in this gear ratio change remain in communication with the outer air through the conduit 149, corresponding bore in the distributing valve 200, space above said valve and the bore 202 in the valve housing.

As will be immediately appreciated from Figure 2, if the distributing valves 190 and 200 are in positions permitting a retardation gear ratio change by the pistons of one of the two cylinders 37 or 47 and simultaneously an acceleration gear ratio change by the piston of the cylinder 57, the latter gear ratio change is prevented, in the same way as described above, by the valves 151 or 161 by means of the main shut-off valve 180, until the piston of the cylinder 37 or 47 has performed its gear ratio change.

Since, in the construction described, only small shut-off slide valves are required for the individual cylinders, there is obtained a construction which is simpler, cheaper and more reliable and possesses less leakage than is the case with the constructions proposed heretofore. The main shut-off valve (180) necessary may be more readily made fluid-tight and reliable than the various small shut-off valves previously used for the individual cylinders. The small shut-off valves provided in the present construction and dependent upon the individual cylinders, do not require any great accuracy and fluid-tightness, since they are not permanently under the action of pressure medium.

I claim:

1. A control device for a gear wheel type change speed gear of the kind having disengageable positive engaging members for effecting changes of gear ratio, acceleration of the driving shaft being necessary for the engagement of some of said gear ratio change members and retardation of the driving shaft being necessary for the engagement of others, and in which the selection of at least one of the gear ratios requires the engagement of gear ratio change members requiring acceleration and of gear ratio change members requiring retardation, said control device comprising fluid pressure operated pistons for engaging and disengaging said gear ratio change members, conduits for pressure medium connected to the cylinders of said pistons, a distributing valve connected to the conduits for carrying pressure medium effective for the engagement of the gear ratio change members requiring acceleration of the driving shaft, a distributing valve connected to the conduits for carrying pressure medium effective for the engagement of the gear ratio change members requiring retardation of the driving shaft, a shut-off valve arranged in series with one of said distributing valves, means for maintaining said shut-off valve shut while pressure medium flowing through the other distributing valve is active for effecting the engagement of gear ratio change members, and means for opening said shut-off valve upon the completion of such engagement.

2. A control device as claimed in claim 1 in which said means for maintaining said shut-off valve shut comprises a fluid pressure operated device acting on said shut-off valve and responsive to fluid pressure transmitted through pressure medium contained in any of said cylinder conduits connected to said other distributing valve.

3. A control device as claimed in claim 1 in which said means for shutting and opening said shut-off valve comprises a fluid pressure operated device acting on said shut-off valve in opposition to a spring tending to open said valve, connecting conduits between said device and each of said cylinder conduits connected to said other distributing valve, valve means in each of said connecting conduits for releasing the pressure therein upon the completion of the engagement of the gear ratio change members operated by the pressure in the cylinder conduit with which said connecting conduit is connected, and valve means in said connecting conduits responsive to pressures acting therein to shut-off those connecting conduits not under pressure when one connecting conduit is under pressure.

4. A control device for a gear wheel type change speed gear of the kind having disengageable positive engaging members for effecting changes of gear ratio, acceleration of the driving shaft being necessary for the engagement of some of said gear ratio change members and retardation of the driving shaft being necessary for the engagement of others, and in which the selection of at least one of the gear ratios requires the engagement of gear ratio change members requiring acceleration and of gear ratio change members requiring retardation, said control device comprising fluid pressure operated pistons for engaging and disengaging said gear ratio change members, conduits for pressure medium connected to the cylinders of said pistons, a distributing valve connected to the conduits for carrying pressure medium effective for the engagement of the gear ratio change members requiring acceleration of the driving shaft, a distributing valve connected to the conduits for carrying pressure medium effective for the engagement of the gear ratio change members requiring retardation of the driving shaft, a shut-off valve arranged in series with said distributing valve connected to the conduits for carrying pressure medium effective for the engagement of the gear ratio change members requiring acceleration of the driving shaft, means for maintaining said shut-off valve shut while pressure medium flowing through the other distributing valve is active for effecting the engagement of gear ratio change members requiring retardation of the driving shaft, and means for opening said shut-off valve upon the completion of said engagement.

ERWIN DAUSCH.